[US Patent 3,022,191 — Feb. 20, 1962]

3,022,191
SHAPED ARTICLES OF PROPYLENE POLYMERS HAVING MODIFIED SURFACE CHARACTERISTICS AND METHOD OF MAKING THE SAME

Vittorio Cappuccio, Avito Monaci, and Alberto Bonvicini, Terni, Italy, assignors to Montecatini Societa Generale per l'Industria Mineraria e Chimica, Milan, Italy
No Drawing. Filed May 27, 1957, Ser. No. 661,618
Claims priority, application Italy June 1, 1956
12 Claims. (Cl. 117—47)

This invention relates to shaped articles of high molecular weight linear polymers of propylene having modified surface characteristics.

The pending applications of G. Natta et al., Serial Nos. 514,097, 514,098 and 514,099 disclose the polymerization of alpha-olefines, including propylene, to new linear, high molecular weight polymers of regular structure. The polymers so obtained are of two types, amorphous and crystallizable, the latter being made up of macromolecules having substantially the structure which has been termed the "isotactic" structure by Natta et al. (see the Communication to the Editor of JACS, published March 20, 1955), which structure is characterized by the fact that, for long sections of the polymer chains, the asymmetric C-atoms of the monomeric units making up the macromolecules have the same steric configuration.

The new alpha-olefine polymers of Natta et al. which consist prevailingly of isotactic macromolecules are hydrophobic and shaped articles thereof present the same situation with respect to dyeing property as do other hydrophobic synthetic resins and plastics, that is, they are not readily dyeable from aqueous baths under the conventional conditions which depend upon penetration of the polymer by the aqueous bath to carry the dye into the shaped structure. For that reason, it is desirable to modify the surface characteristics of the shaped articles of the polymers both as to dyeing capacity and in various other respects as well.

The pending application of G. Natta et al., Serial No. 643,915, discloses that if the new high molecular weight linear polymerizates of propylene consisting prevailingly of isotactic polypropylene are peroxidized by exposing the articles to air or oxygen-containing gaseous mixtures at a temperature of 50° C. to 120° C., or even at lower temperatures (20° C. to 30° C.) sufficient oxygen in peroxidic form is introduced into the article comprising the polypropylene to permit polymeric chains of monomers polymerizable with a radical mechanism to be grafted onto the surface of the peroxidized article. The grafting occurs spontaneously under heating and can be accomplished by simply immersing the superficially peroxidized articles in a liquid or gaseous phase containing the monomer the polymeric chains of which are to be grafted onto the polypropylene articles.

The polymeric chains are permanently grafted on the polypropyelene. This is proved by the fact that the polymer thus formed cannot be removed from the shaped article by extraction with hot solvents which normally dissolve the homopolymers of the monomers used.

The monomers polymerizable with a radical mechanism which were found to be useful for grafting homopolymeric chains onto the peroxidized polypropylene articles include styrene and various acrylic acid derivatives, e.g., alkyl acrylates, alkyl methacrylates, and acrylonitrile.

Grafting of the chains of the homopolymers of the mentioned monomers onto the surface of the polypropylene articles modifies the surface characteristics of the latter. For instance, the modified articles have an increased water-absorption capacity and can be dyed more readily.

It was found that not all monomers normally polymerizable with the radical mechanism could be used for grafting homopolymer chains onto the shaped articles comprising the peroxidized propylene polymerizate consisting prevailingly of isotactic polypropylene, by treating the articles with the liquid or gaseous phase consisting of the monomer. Thus it was found that when the liquid or gaseous phase consisted of a vinyl ester, such as vinyl acetate or vinyl chloroacetate, no grafting of chains of the homopolymer occurred.

It is desirable to graft polymeric chains comprising units derived from such monomers as vinyl acetate and vinyl chloroacetate onto polypropylene articles because of the ease with which polymers comprising such units can be modified chemically to yield final shaped articles of the polypropylene having particularly desirable properties.

For instance, the grafted polyvinyl acetate can be saponified to convert acetate groups to hydroxyl groups the presence of which improves the wettability, dyeability and antistatic properties of the shaped articles as compared to those properties of articles consisting of the unmodified propylene polymers.

Polypropylene articles containing grafted polyvinyl chloroacetate chains can be treated with nitrogen-containing substances, such as hexamethylene diamine, diethylamine and thiourea to obtain articles containing quaternary nitrogen which has an affinity for the acid wool-type dyestuffs and functions to fix those dyes permanently on the surface of the dyed shaped article. Also, the quaternarized polyvinyl chloroacetate modifies the surface characteristics in other respects, in the same manner as does the saponified polyvinyl acetate.

A primary object of this invention is, therefore, to provide a method for grafting polymeric chains comprising monomeric units derived from vinyl and other similar unsaturated esters polymerizable with a radical mechanism onto the surface of shaped articles comprising peroxidized polypropylene.

Another object is to provide the new shaped articles comprising the linear, high molecular weight propylene polymers having polymeric chains comprising monomeric units derived from vinyl and like esters grafted on the surface thereof.

These and other objects are accomplished by the present invention in accordance with which shaped articles comprising the peroxidized linear propylene polymerizate of Natta et al. which consists prevailingly of isotactic polypropylene are treated with at least one vinyl, allyl or methallyl ester of a carboxylic acid R—COOH in which R is a radical containing 1–2 carbon atoms, or of the chlorine-substituted acids, in the presence of at least one other "auxiliary" monomer copolymerizable therewith with a radical mechanism. The auxiliary monomer may be one which, used alone, is capable of being grafted onto the articles in the form of homopolymeric chains. Under these conditions, the polymeric chains grafted onto the shaped article are chains of a copolymer of the unsaturated ester with the "auxiliary" monomer.

The "auxiliary" monomer may be, for instance, styrene or an acrylic acid derivative, e.g., an acrylate, methacrylate of acrylonitrile. The amount of the "auxiliary" monomer present in the treating medium may vary so long as it is present in a minimum amount of 5 molar percent of the vinyl ester.

The graft polymerization can be accelerated by carrying it out in the absence of oxygen, which can be eliminated from both the monomers and from the polypropylene articles by subjecting them to vacuum, or by treating them with a stream of nitrogen.

The shaped articles comprising the peroxidized polypropylene which can be treated according to the invention may be fibers, films, foils, yarns, or molded articles of various shapes. The shaped articles are given a peroxidizing pre-treatment with a gaseous mixture containing 10% to 100% of oxygen, at pressures ranging from 1 atmosphere to 10 atmospheres, and at temperatures ranging from room temperature to 120° C.

The amount of peroxidic oxygen fixed to the polypropylene article without impairing the mechanical characteristics thereof may vary and, for efficient grafting of the copolymeric chains on the article may be, in general, from 0.01 to 1.0 gram/100 grams of the polypropylene. The specific amount of peroxidic oxygen fixed to the article may vary depending on the article treated and the volume-surface ratio thereof. Amounts of peroxidic oxygen ranging from 0.01 to 1.0 g./m.$^2$ are generally sufficient for the present purposes.

The grafting of the copolymeric chains onto the surface of the shaped article can be carried out at normal pressure or at lower or higher pressures. The rate of polymerization of the monomer mixture comprising the auxiliary monomer and the monomeric unsaturated ester varies according to the amount of the unsaturated ester contained therein and is low when such ester content is above 90%. In general, the amount of the "auxiliary" monomer contained in the copolymer molecule is higher than the amount of that monomer present in the treating medium.

The following examples illustrate both the process of grafting the copolymers onto the polypropylene articles and certain chemical after-treatments of the products thus obtained. These examples are given as illustrative only and are not intended to be limiting.

EXAMPLE 1

Skeins of an 18-ends polypropylene yarn of a 74 den. count, twisted at 405.2 twists per meter having a tenacity of 5.5 g./den. and an elongation of 30%, are subjected to peroxidation in air at 85° C. for 14 hours, until their peroxide oxygen content reaches a value of 0.25% (0.18 g./m.$^2$).

The skeins thus treated are then introduced into large test tubes containing mixtures of vinyl chloroacetate and acrylonitrile of different compositions, as specified in Table I below.

The tubes are cooled by a solid carbon dioxide acetone mixture, repeatedly evacuated to a residual pressure of 0.5 mm., and finally sealed.

The tubes are then introduced into a thermostatic bath kept at 75° C., and are maintained in the bath for 1½ hours.

After their removal from the tubes, the skeins are rinsed with methanol, in order to remove the unpolymerized monomers, and repeatedly rinsed with boiling acetone and with dimethyl formamide at 100° C. in order to separate any non-grafted vinyl chloracetate-acrylonitrile polymers which may have formed.

The analysis of the copolymers grafted on the yarn shows that their vinyl chloracetate content is lower than in the monomer mixtures.

Table I

VINYL CHLORACETATE, MOLS PERCENT

| In the Monomer Mixture | In the Grafted Chains |
|---|---|
| 33 | 10 |
| 50 | 16 |
| 67 | 19 |
| 71 | 21 |
| 80 | 40 |

The amount of copolymer grafted on the yarn is increased when the percentage of acrylonitrile in the monomer is increased.

Table II

| Acrylonitrile, mols percent in the monomers mixture | Weight increase percent of the article |
|---|---|
| 9 | 2.1 |
| 20 | 2.9 |
| 29 | 4.9 |
| 33 | 11.2 |
| 56 | 43.1 |
| 67 | 74.8 |

The final shaped article, comprising polypropylene macromolecules having side chains of an acrylonitrile-vinyl chloracetate copolymer thereon, can be treated with amines to form quaternary ammonium compounds which impart both wettability and dyeability to the filaments.

A control skein of the same polypropylene filaments, which had not been subjected to peroxidation does not show any increase in weight when it is treated with the above cited mixture under the same operating conditions.

EXAMPLE 2

Skeins obtained as described in Example 1 are treated at 100° C. for ½ hour with a 10% solution of hexamethylene-diamine, then washed with hot water to remove the unreacted amine. After such treatment, the skeins are dyeable with acid dyes. The dyeing is carried out with a fiber-bath ratio of 1:30, using 5% of Fast Red A, in the presence of 3.5% acetic acid and 15% sodium sulfate crystals, the percentage being computed on the fibers weight.

Dyeing is performed at the boiling temperature for 1½ hours then the skeins are removed and washed. All of the skeins are dyed a red color the intensity of which varies according to the vinyl chloroacetate content.

Good results are also attainable using other acid dyes, such as Bright Acid Green 5G, and Bright Follone Violet S4B. Particularly good fastness to washing and to ethylene trichloride is obtained using chrome dyes such as Fast Follone Red R with the addition of potassium dichromate, and Stenamine Red R.

The superficial layer of grafted polymer, particularly after treatment with amines, is resistant to solvent attack. Fibers of the unmodified polypropylene are swollen by boiling ethylene trichloride. The same solvent does not attack fibers containing more than 50% by weight of grafted acrylonitrile-vinyl chloracetate copolymer, or fibers containing only 15% of said copolymer which have been after-treated with hexamethylenediamine.

The mechanical properties of the grafted fibers, using a molar vinyl chloracetate/acrylonitrile ratio of 2.45 (with 29 moles acrylonitrile per 100 moles in the monomer mixture), with a resulting weight increase of the fibers of 4.9%, are the following: tenacity 5.1 g./den., elongation 28%. These properties do not undergo any appreciable change after the dyeing and quaternarizing treatment.

Following ASTM standards, humidity absorption tests were carried out on four samples of polypropylene fibers which had previously been grafted, according to the procedure described in Example 1, with a vinyl chloracetate-acrylonitrile mixture in a molar ratio of 3:1, and subsequently quaternarized with hexamethylenediamine and dried.

Said samples were introduced into a test chamber at 25° C. and containing a saturated solution of ammonium nitrate which maintained it at 65% relative humidity.

The humidity absorption values, as indicated by successive weight increases of the fibers, were ascertained to be: 5.5%, 7.3%, 10%, and 10.2%.

An untreated sample of the same isotactic polypropylene fiber did not show any weight increase, when subjected to the same test.

Skeins obtained according to the method outlined in Example 1 and treated at 100° C. for ½ hour with a 10% thiourea or diethylamine solution are also dyeable with acid dyes.

EXAMPLE 3

Peroxidized fibers similar to those described in Example 1, are dipped into vinyl acetate-acrylonitrile mixtures of varying composition. After heating for 2 hours at 72° C., and washing, according to the procedure outlined in Example 1, products are obtained in which the percentage of grafted copolymer increases with an increase of the auxiliary monomer (acrylonitrile) concentration in the mixture.

Table III

| Acrylonitrile, moles percent in the monomer mixture | Grafted copolymer, weight percent on the peroxidized polypropylene skeins |
|---|---|
| 20 | 1.6 |
| 33 | 3.7 |
| 50 | 8.0 |
| 66 | 10.0 |

On a non-peroxidized control skein, treated in the same way, then repeatedly rinsed with acetone and dimethyl formamide, no weight increase was ascertained.

EXAMPLE 4

Temperature considerably affects the polymerization process. A temperature increase accelerates the formation of both grafted and non-grafted polymer, the latter generally being formed by chain transfer.

Skeins obtained according to the procedure described in Example 1 were introduced into a vinyl chloracetate-methyl-methacrylate mixture of molar ratio 1:1.

At increasing temperatures, quantities of grafted and non-grafted polymer were obtained as shown in Table IV.

Table IV

| Temperature, ° C. | Test Duration, Hrs. | Grafted polymer, percent on the weight of the skein | Ungrafted Polymer, percent on the weight of the skein |
|---|---|---|---|
| 65 | 1.15′ | 2 | 0 |
| 70 | 1.15′ | 7 | 0 |
| 75 | 0.30′ | 25 | 78 |

A non-peroxidized control skein, dipped into the monomer mixture for 1¼ hours at 75° C. showed weight increase of 5.2%.

The polymer thus formed was, however, completely soluble in boiling acetone. This shows that the polymer was not grafted.

EXAMPLE 5

Increasing amounts of oxygen, present in the form of hydroperoxy groups on peroxidized articles, promote the grafting of increasing percentages of polymer, all other conditions being equal.

Peroxidized skeins with variable peroxide content were dipped into an acrylonitrile-vinyl chloracetate mixture of molar ratio 1:3 for 1¼ hours at 70° C.

The results of this treatment are given in Table V.

Table V

| No. | Peroxide oxygen, weight percent on the fibers | Grafted polymer, percent on the fibers |
|---|---|---|
| 1 | 0.04 | 1.5 |
| 2 | 0.12 | 3.3 |
| 3 | 0.38 | 4.4 |
| 4 | 0.73 | 5.4 |
| 5 | 0.81 | 13.1 |
| 6 | 1.38 | 19.2 |

During the above described treatments, the mechanical properties of the fibers did not undergo any appreciable change.

The peroxidation, grafting, washing and drying treatments do not appreciably alter the mechanical properties.

Skein No. 3 of initial count 82 den., tenacity 5.5 g./den., elongation 30%, after peroxidation, grafting, washing and drying had a count of 84 den., a tenacity of 5.3 g./den., an elongation of 26%.

EXAMPLE 6

Increase in the polymerization time results in an increase in the percentage of grafted polymer up to a limit value.

Skeins of isotactic polypropylene containing 0.4% of peroxide oxygen were kept at 75° C. for different times in a vinyl chloracetate-acrylonitrile mixture of molar ratio 3:1. After washing according to the previously outlined procedure, the weight increases recorded in Table VI were measured.

Table VI

| Polymerization time, hrs. | Skeins weight increase, percent |
|---|---|
| 1 | 3.7 |
| 2 | 9.0 |
| 3 | 22.0 |
| 4 | 32.0 |
| 10 | 35.0 |

EXAMPLE 7

A 0.37 mm. thick film of crystallizable polypropylene having an intrinsic viscosity of 1.2, obtained by extrusion of the molten polymer, is heated in air at 75° C. for 15 hours until a content of 0.15% of peroxide oxygen is reached.

The peroxidized film is then kept for 5 hours at 70° C. in the absence of air, in a vinyl chloracetate-acrylonitrile mixture containing the two monomers in a 2.45:1 molar ratio. After washing with methanol to eliminate unreacted monomers, the film is then treated first with acetone at 50° C. and then with dimethylformamide at 100° C., in order to remove non grafted homopolymers.

When treated for 2 hours at 100° C. with a 10% solution of hexamethylene-diamine, the film shows then a good dyeability with acid and acetate dyes.

The monomer mixtures may contain the unsaturated ester in an amount of from 5 molar percent to 95 molar percent.

The linear, regular, head-to-tail polymers of propylene which, after peroxidation, have the copolymers grafted thereon in accordance with this invention, can be obtained, as shown in the applications of Natta et al. supra, by polymerizing propylene with the aid of a catalyst obtained from a compound of a transition metal of the 4th to 6th groups of the periodic table and an organometallic compound of a metal of the 2nd or 3rd group of the periodic table. The transition metal compound may be, for example, a halide or other highly reactive compound of titanium, vanadium, zirconium, molybdenum or other transition metals of the 4th to 6th groups of the periodic table. Typical useful transition metal compounds are titanium tetrachloride and titanium trichloride.

The organometallic compound may be, for instance, an alkyl compound of beryllium, cadmium, zinc or other metal of the 2nd group, as well as of aluminum and other metals of the 3rd group of the periodic table. Typical useful organometallic compounds are aluminum triethyl, zinc diethyl, and diethyl aluminum monochloride.

A useful molar ratio of the metal alkyl to the transition metal compound is 1:1 to 10:1.

The catalyst can be prepared by mixing the metal alkyl with an inert hydrocarbon solvent, such as one of those mentioned above, mixing the transition metal compound with a solvent of the same group, bringing the mixtures together, and introducing the resulting product into the polymerization reactor, with or without further dilution with the inert hydrocarbon solvent. The catalyst can also be prepared in the presence of the monomeric propylene.

The polymerization of propylene with the aid of these catalysts is usually carried out in an inert hydrocarbon solvent such as n-heptane, iso-octane, a light gasoline fraction free of olefinic bonds, or anhydrous benzene, at temperatures between 50° C. and 100° C. and at atmospheric pressures or at increased pressure up to about 30 atmospheres.

The propylene polymers so produced have high molecular weights above at least 1000 and up to 100,000 or higher.

The following is an example of the production of a propylene polymer which may be formed into shaped articles to be peroxidized and then treated according to the present method for modification of the surface characteristics.

Into a 435 cm.³ oscillating autoclave are introduced two stainless steel balls and a vial containing 1.85 g. (0.012 mole) titanium trichloride; a solution of 3.9 g. tripropyl aluminum in 100 cm.³ heptane is then added under nitrogen. The autoclave is heated to 73° C. and at this temperature 90 g. propylene are introduced. The autoclave is then set in motion so as to break the vial. This leads to the formation of a coarsely dispersed catalytic agent. After 10 hours' reaction at a temperature between 70 and 75° C., the reaction product is taken out. It appears as a solid very compact mass containing a large amount of adsorbed solvent. The purification is carried out by washing with diluted hydrochloric acid, as described previously. 72 g. of a solid white polypropylene are obtained, which are then fractionated by extraction with hot solvents.

The acetone extract corresponds to 3.5% of the obtained polymer and is formed by oily, low molecular weight products.

The ether extract corresponds to 13.3% of the total, and is formed of a solid amorphous polypropylene, showing an intrinsic viscosity of 0.725 (in tetralin at 135° C.), which corresponds to a molecular weight of about 20,000.

The heptane extract corresponds to 11.4% of the total and consists of a polypropylene having an intrinsic viscosity of 0.9, i.e. a molecular weight of about 28,000. Under the X-rays, this fraction appears to consist of polypropylene with a crystallinity higher than 50%.

The extraction residue is 71.8% of the total, and is formed of a highly crystalline (isotactic) polypropylene having an intrinsic viscosity of 3.08, i.e., a molecular weight of about 180,000. The raw polymer had therefore a total content of crystalline polypropylene of at least 77.5%.

The residue consisting of the propylene polymerizate consisting prevailingly of isotactic polypropylene can be formed into shaped articles to be peroxidized and then treated for grafting of the copolymeric chains onto the polypropylene chains at the surface of the article. Thus, as shown by Natta et al., filaments or threads can be obtained from said residue by extruding the same, in softened condition, through a spinneret and then either warm or cold stretching the extruded filament. The stretched filament is highly crystalline and has a very high breaking load.

Some changes may be made in practicing this invention without departing from the spirit and scope thereof. It is to be understood, therefore, that it is intended to claim as part of the invention, such variations and modifications as lie within the scope of the invention and of the appended claims, and intended to include within the scope of said claims such changes as may be apparent to those skilled in this art in the practice of the principles of the invention as set forth in this specification.

What is claimed is:

1. A process for modifying the surface characteristics of shaped manufactured articles comprising a propylene polymerizate consisting prevailingly of isotactic polypropylene, without altering the shape or mechanical characteristics of the articles, which process consists essentially of the steps of (A) first contacting the shaped manufactured articles with a gaseous mixture containing from about 10% to 100% of oxygen at a pressure from about 1 atmosphere to 10 atmospheres and at a temperature from about room temperature to 120° C. until the oxygen content of the shaped article is from about 0.01 to 1.0 gram per square meter, (B) then treating the shaped articles with a liquid medium maintained at a temperature between about 65° C. and about 75° C. and comprising a mixture of monomers copolymerizable with a radical mechanism and consisting essentially of (1) at least one monomer selected from the group consisting of vinyl esters of carboxylic acids R—COOH in which R is an alkyl radical containing from 1 to 2 carbon atoms and chlorine-substituted derivatives of said acids, and (2) at least one other monomer copolymerizable with (1), the amount of (2) being equal to at least 5 mols per each 100 mols of (1) that are used, whereby copolymerization of monomers (1) and (2) is initiated by free radicals liberated by decomposition of the peroxidic oxygen groups present in the polypropylene chain at the temperature stated and chains of a copolymer of monomers (1) and (2) are grafted onto the polypropylene chains at the surface of the shaped manufactured articles, (C) washing the articles with a solvent for any unpolymerized monomers (1) and (2) and for any non-grafted copolymers of monomers (1) and (2) formed during the treatment, and (D) drying the surface-modified manufactured shaped articles.

2. The process according to claim 1, characterized in that the liquid treating medium comprises a mixture of (1) vinyl acetate and (2) at least one monomer copolymerizable with vinyl acetate and selected from the group consisting of styrene, alkyl acrylates, alkyl methacrylates, and acrylonitrile, and the shaped article having the copolymer chains grafted onto the polypropylene chains at the surface of the article is treated to saponify the acetate groups of the copolymer units derived from the vinyl acetate to thereby form hydroxyl groups on the grafted copolymer chains and improve the dyeing, wetting, and antistatic properties of the shaped, manufactured articles.

3. The process according to claim 1, characterized in that the liquid treating medium comprises a mixture of (1) vinyl chloracetate and (2) a monomer copolymerizable with vinyl chloracetate and selected from the group consisting of styrene, alkyl acrylates, alkyl methacrylates and acrylonitrile, and the units of the grafted copolymer chains derived from the vinyl chloracetate are then quaternarized by treating the article with a substance selected from the group consisting of hexamethylenediamine, diethylamine and thiourea, to thereby impart receptivity for acid dyestuffs to the shaped, manufactured article.

4. The process according to claim 1, characterized in that the liquid medium comprising the mixed monomers consists essentially of (1) at least one monomer selected from the group consisting of vinyl esters of carboxylic acids R—COOH in which R is an alkyl radical containing from 1 to 2 carbon atoms and chlorine substituted derivatives of said acids, and (2) at least one monomer selected from the group consisting of styrene, alkyl acrylates, alkyl methacrylates and acrylonitrile.

5. The process according to claim 1, characterized in that the liquid medium comprising the mixed monomers consists essentially of vinyl acetate and methyl methacrylate.

6. The process according to claim 1, characterized in that the liquid medium comprising the mixed monomers consists essentially of vinyl acetate and acrylonitrile.

7. The process according to claim 1, characterized in that the liquid medium comprising the mixed monomers consists essentially of vinyl chloracetate and methyl methacrylate.

8. The process according to claim 1, characterized in that the liquid medium comprising the mixed monomers consists essentially of vinyl chloracetate and acrylonitrile.

9. The process according to claim 1, characterized in that the liquid medium comprising the mixed monomers consists essentially of from 5 mols percent to 95 mols percent of vinyl acetate and at least 5 mols percent of methyl methacrylate.

10. The process according to claim 1, characterized in that the liquid medium comprising the mixed monomers consists essentially of from 5 mols percent to 95 mols percent of vinyl chloracetate and at least 5 mols percent of methyl methacrylate.

11. The process according to claim 1, characterized in that the liquid medium comprising the mixed monomers consists essentially of from 5 mols percent to 95 mols percent of vinyl acetate and at least 5 mols percent of acrylonitrile.

12. The process according to claim 1, characterized in that the liquid medium comprising the mixed monomers consists essentially of from 5 mols percent to 95 mols percent of vinyl chloracetate and at least 5 mols percent of acrylonitrile.

References Cited in the file of this patent

UNITED STATES PATENTS

| | | |
|---|---|---|
| 2,122,826 | Van Peski | July 5, 1938 |
| 2,430,479 | Pratt et al. | Nov. 11, 1947 |
| 2,461,966 | Davis | Feb. 15, 1949 |
| 2,668,134 | Horton | Feb. 2, 1954 |
| 2,685,534 | Kling | Aug. 3, 1954 |
| 2,767,103 | Loukomsky | Oct. 16, 1956 |
| 2,837,496 | Vandenberg | June 3, 1958 |
| 2,907,675 | Gaylord | Oct. 6, 1959 |

FOREIGN PATENTS

| | | |
|---|---|---|
| 538,782 | Belgium | Dec. 6, 1955 |
| 750,923 | Great Britain | June 20, 1956 |